United States Patent
Baumgarten et al.

(10) Patent No.: US 11,895,950 B2
(45) Date of Patent: Feb. 13, 2024

(54) SYSTEM AND METHOD FOR CUTTING TABLE LENGTH ADAPTATION

(71) Applicant: CLAAS Selbstfahrende Erntemaschinen GmbH, Harsewinkel (DE)

(72) Inventors: Joachim Baumgarten, Beelen (DE); Andreas Wilken, Bissendorf (DE); Dennis Neitemeier, Lippetal (DE); Bastian Bormann, Gütersloh (DE); Sebastian Spiekermann, Ostbevern (DE); Daniel Irmer, Herzebrock-Clarholz (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 415 days.

(21) Appl. No.: 17/162,553

(22) Filed: Jan. 29, 2021

(65) Prior Publication Data
US 2021/0235622 A1 Aug. 5, 2021

(30) Foreign Application Priority Data
Feb. 3, 2020 (DE) .................... 102020102596.3

(51) Int. Cl.
*A01D 41/14* (2006.01)
*A01D 41/127* (2006.01)
*A01D 57/12* (2006.01)

(52) U.S. Cl.
CPC ....... *A01D 41/141* (2013.01); *A01D 41/1271* (2013.01); *A01D 57/12* (2013.01)

(58) Field of Classification Search
CPC ............ A01D 34/008; A01D 41/127; A01D 41/1271; A01D 41/1272; A01D 41/1273;
(Continued)

(56) References Cited

U.S. PATENT DOCUMENTS 6,213,870 B1 * 4/2001 Satzler ............... A01F 7/062
460/7
9,807,926 B2 11/2017 Wilken
(Continued)

FOREIGN PATENT DOCUMENTS

CA 2880556 A1 * 2/2014 ............. A01D 41/14
DE 102005050751 A1 8/2007
(Continued)

OTHER PUBLICATIONS

EPO machine translation of EP 2681984 A1 (original EP document published Jan. 8, 2014) (Year: 2014).*
(Continued)

*Primary Examiner* — David A Testardi
(74) *Attorney, Agent, or Firm* — Lempia Summerfield Katz LLC

(57) ABSTRACT

An agricultural harvester is disclosed. The agricultural harvester includes a cutting unit that has a cutting table adjustable in its cutting table length, a reel adjustable to a reel vertical position and reel longitudinal position, an inclined conveyor downstream from the cutting unit, and a driver assistance system. The driver assistance system autonomously determines, using at least one input variable, at least one machine parameter and specifies the machine parameter to the cutting unit. The machine parameter can include one or more of the cutting table length, the reel vertical position, or the reel longitudinal position. In particular, the driver assistance system may determine a harvested material throughput and a vibration coefficient describing the fluctuation in the harvested material throughput in a region lying in front of the threshing system and adapt or modify the cutting table length based on the determined vibration coefficient.

19 Claims, 3 Drawing Sheets

(58) Field of Classification Search
CPC ...... A01D 41/14; A01D 41/141; A01D 57/12; G05B 13/04
See application file for complete search history.

(56) References Cited

U.S. PATENT DOCUMENTS

| | | | | |
|---|---|---|---|---|
| 11,596,102 | B2* | 3/2023 | Neitemeier | A01D 61/008 |
| 2003/0172636 | A1* | 9/2003 | Clauss | A01D 41/127 56/10.2 R |
| 2005/0072135 | A1* | 4/2005 | Kormann | A01D 41/127 56/500 |
| 2009/0107094 | A1* | 4/2009 | Bich | A01D 41/141 56/10.2 E |
| 2012/0004813 | A1* | 1/2012 | Baumgarten | A01D 41/127 701/50 |
| 2014/0245712 | A1* | 9/2014 | Roberge | A01D 34/664 701/50 |
| 2014/0295922 | A1* | 10/2014 | Buermann | A01D 41/06 460/149 |
| 2015/0216123 | A1* | 8/2015 | Digman | A01D 41/141 56/14.9 |
| 2016/0052525 | A1* | 2/2016 | Tuncer | B60W 10/06 701/50 |
| 2016/0106038 | A1* | 4/2016 | Boyd | A01D 34/006 56/10.2 J |
| 2017/0049045 | A1* | 2/2017 | Wilken | A01D 34/008 |
| 2017/0091954 | A1 | 3/2017 | Roth et al. | |
| 2018/0199508 | A1* | 7/2018 | Mueller | A01D 43/077 |
| 2018/0242523 | A1* | 8/2018 | Kirchbeck | A01C 21/005 |
| 2019/0021226 | A1* | 1/2019 | Dima | A01D 34/008 |
| 2019/0246561 | A1* | 8/2019 | Neitemeier | A01D 41/127 |
| 2019/0261559 | A1* | 8/2019 | Heitmann | A01D 41/127 |
| 2019/0261561 | A1* | 8/2019 | Heitmann | A01D 43/085 |
| 2021/0015040 | A1 | 1/2021 | Neitemeier et al. | |
| 2021/0185877 | A1* | 6/2021 | Hunt | A01B 63/002 |
| 2022/0346316 | A1* | 11/2022 | Schrattenecker | A01D 41/141 |
| 2023/0065442 | A1* | 3/2023 | Spiekermann | A01D 41/1271 |

FOREIGN PATENT DOCUMENTS

| | | | | |
|---|---|---|---|---|
| DE | 102019116452 | A1 | 12/2020 | |
| EP | 2681984 | A1 * | 1/2014 | ........... A01D 41/141 |
| EP | 2681984 | A1 | 1/2014 | |
| EP | 2863729 | B1 * | 9/2016 | ............. A01D 41/14 |
| EP | 3085221 | A1 * | 10/2016 | ........... A01D 41/127 |
| EP | 3132665 | A1 * | 2/2017 | ........... A01D 41/127 |
| EP | 3132665 | A1 | 2/2017 | |
| EP | 3150047 | A1 | 4/2017 | |
| EP | 3300580 | A1 * | 4/2018 | ........... A01D 41/141 |
| EP | 3766329 | A1 | 1/2021 | |
| WO | WO-2020206951 | A1 * | 10/2020 | ........... A01D 41/141 |

OTHER PUBLICATIONS

EPO machine translation of EP 3300580 A1 (original EP document published Apr. 4, 2018) (Year: 2018).*

European Search Report issued in related application No. EP 20205626.3, dated Apr. 28, 2021 (6 pages).

* cited by examiner

SYSTEM AND METHOD FOR CUTTING TABLE LENGTH ADAPTATION

CROSS REFERENCE TO RELATED APPLICATION

This application claims priority under 35 U.S.C. § 119 to German Patent Application No. DE 102020102596.3 filed Feb. 3, 2020, the entire disclosure of which is hereby incorporated by reference herein.

TECHNICAL FIELD

The invention relates to an agricultural harvester that is configured for cutting table length adaptation.

BACKGROUND

For various crops, such as for grain, rapeseed, or soy, combines are provided with a harvesting header that is designed as a length-adjustable cutting unit. Corresponding cutting units that are used for harvesting these different types of crops have at least one cutting table that is movable relative to the cutting unit trough by means of a corresponding adjusting element, wherein this cutting table is provided with a cutter bar for cutting the crop. Consequently, a corresponding longitudinal displacement of the cutting table relative to the auger arranged in the cutting unit trough can adapt the cutting table length of the cutting unit in order to improve or optimize the infeed of the harvested material at different stalk lengths, such as when harvesting rapeseed. For example, the goal is to avoid an inhomogeneous material flow and resultant crop loss arising from a portion of the ears of grain and rapeseed hulls or rapeseed grains not going into the cutting unit trough (and in turn passing from there via the inclined conveyor into the threshing and separating device), but rather onto the field where it goes to seed in certain circumstances.

In the event of a short cutting table length, the harvested material is pushed by the reel toward the auger. When the harvested material is shoved forward by the reel and wheat stalks collect in the region between the blade and auger because the cutting table is adjusted too short, it causes an uneven supply of harvested material to the inclined conveyor. Moreover, an uneven stubble pattern arises. A backlog forms in the middle of the cutting unit, and the stalks are pushed forward before being cut by the mowing blade.

When the cutting table length is too long, the harvested material collects behind the blade and is pressed by the following harvested material or by the reel toward the auger so that, generally speaking, an overly long cutting table length also causes an uneven harvested material supply.

An inhomogeneous material flow arising at the cutting unit results in an inhomogeneous feeding of the working units of the harvester, which is in turn associated with sacrifices of output, sacrifices of quality, and losses of grain. Accordingly, controlling the cutting table length is desirable to achieve an optimum harvested material throughput combined with a homogeneous harvested material supply.

Generally speaking, the driver is only occasionally successful in manually adapting the cutting table length to existing and in particular changeable harvesting conditions. Moreover, the driver may not wish to control and adapt the cutting table length manually and adapt it to continuously changing harvesting conditions before and during a harvesting process. To assist the harvester driver, the control of the longitudinal displacement of the cutting table relative to the auger may be automatic so that it adapts to the current harvesting conditions without intervention by the driver.

An agricultural harvester (such as one disclosed in US Patent Application Publication No. 2017/0049045, incorporated by reference herein in its entirety) includes an automated cutting unit for automatically determining at least one cutting unit parameter. In this regard, the driver selects a harvesting process strategy with which the cutting unit parameters can be autonomously adapted. The cutting unit parameters to be determined include, inter alia, the cutting table length.

A combine (such as one disclosed in US Patent Application Publication No. 2019/0246561, incorporated by reference herein in its entirety) may include a sensor apparatus for the contact-free detection of the layer height, and a method that uses the information from the sensor apparatus to change the operating parameters.

DETAILED DESCRIPTION

Figure 1:
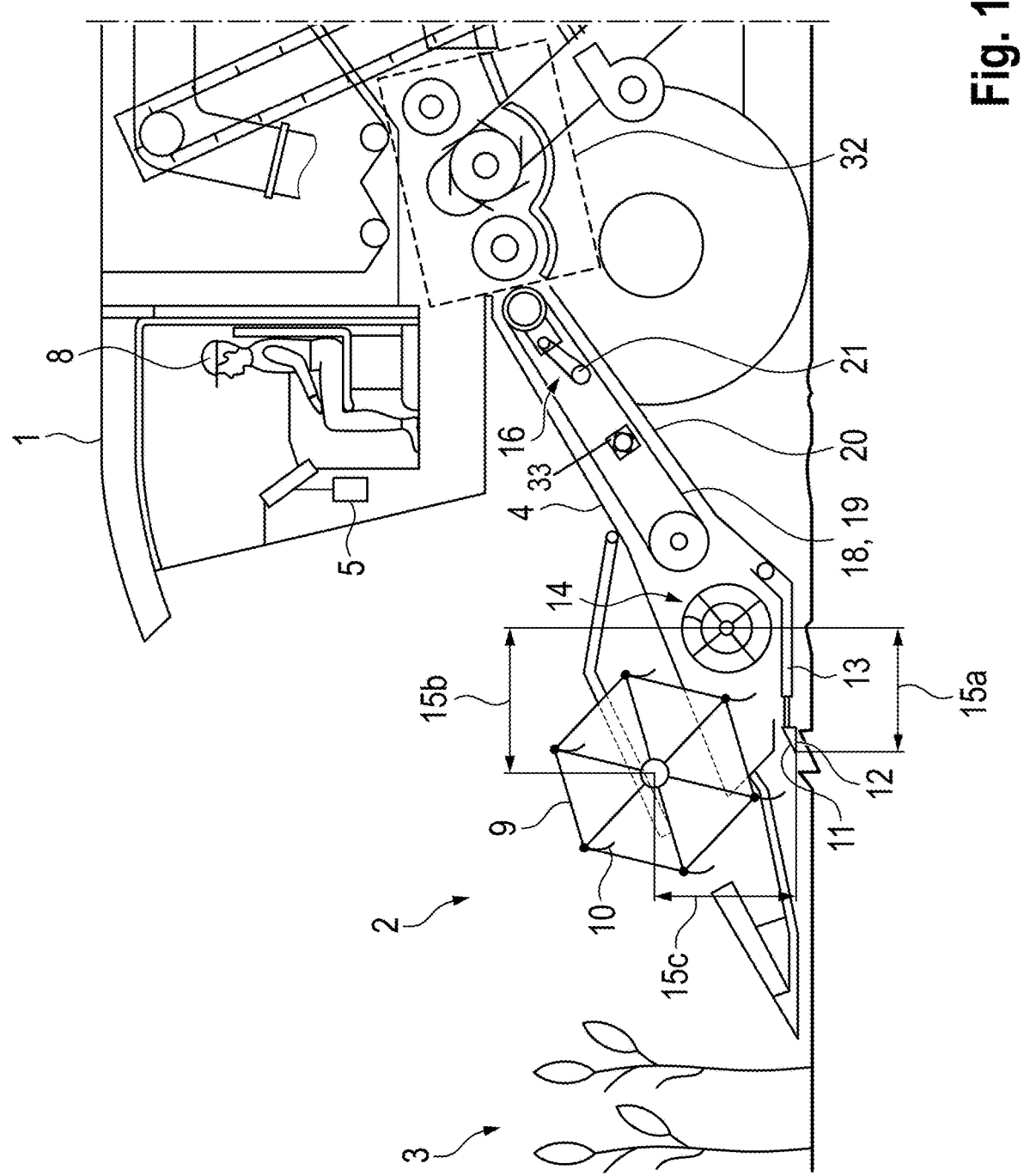
FIG. 1 illustrates a side view of an example harvester.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

As discussed in the background, an automated cutting unit may automatically determine at least one cutting unit parameter, such as the cutting table length. However, the cutting unit parameter of the "cutting table length" may not be autonomously determined depending on a vibration coefficient that describes the variances of the harvested material throughput caused by an inhomogeneous flow of harvested material. As explained above, the cutting table length influences the homogeneity of the harvested material flow to a great extent. Inhomogeneities in the harvested material flow arising in the cutting unit result in the already-mentioned inhomogeneous feeding of the working units of the harvester and an associated irregular operation of the harvester, negatively effecting performance and quality, and resulting in loss of grain.

Further, as discussed in the background, a combine may include a sensor apparatus for detecting the layer height. However, other information may be sought. As one example (discussed further below), information with regard to the fluctuations in the harvested material throughput may be detected, with the cutting unit parameters controlled accordingly with this information.

Thus, in one or some embodiments, an agricultural harvester is disclosed that is equipped with a harvesting header for cutting and receiving harvested material, and at least one cutting table that is adjustable in terms of its cutting table length and is assigned to the cutting unit (e.g., may be integrated, associated, or work with the cutting unit), a reel assigned to the cutting unit that can be adjusted to a reel vertical position and reel longitudinal position, an inclined conveyor downstream from the cutting unit and upstream from the threshing system of the harvester, a driver assistance system for controlling the cutting unit, wherein the driver assistance system comprises a memory for saving data and a computing device for processing the data saved in the memory, wherein the computing device is configured to autonomously determine at least one machine parameter by means of at least one input variable and specify it to the cutting unit, wherein the machine parameters may comprise any one, any combination, or all of: the cutting table length; the reel vertical position; or the reel longitudinal position. Thus, in one or some embodiments, the driver assistance system may automatically control the cutting table length with which throughput fluctuations are reduced.

In one or some embodiments, an agricultural harvester, such as a combine, may include a cutting unit designed as a harvesting header for cutting and receiving the harvested material. In one or some embodiments, the disclosed agricultural harvester comprises at least one cutting table with an adjustable length that is assigned to the cutting unit, a reel assigned to the cutting unit that can be adjusted to a reel vertical position and reel longitudinal position, an inclined conveyor downstream from the cutting unit and upstream from the threshing system of the harvester, a driver assistance system for controlling the cutting unit, wherein the driver assistance system comprises a memory for saving data and a computing device for processing the data saved in the memory. As discussed above, the computing device may be configured to autonomously determine at least one machine parameter using at least one input variable and specify it to the cutting unit, wherein the machine parameter(s) may comprise any one, any combination, or all of the cutting table length, the reel vertical position, or the reel longitudinal position. According to one or some embodiments, means are provided that determine a harvested material throughput and a vibration coefficient describing the fluctuation in the harvested material throughput in a region lying in front of the threshing system. Moreover, the driver assistance system may be configured to adapt the cutting table length from the determined vibration coefficients.

The disclosed driver assistance system may result in any one, any combination, or all of the following benefits. First, automatically determining the cutting table length assists the driver since continuously monitoring the cutting table length requires a high degree of concentration and attention. As described above, an overly short or overly long cutting table length leads to an uneven harvested material supply on the inclined conveyor and an uneven feeding of the working units downstream from the inclined conveyor in terms of processing, such as for example a threshing system. By adapting the cutting table length from the determined vibration coefficient, the cutting table length may be adjusted such that an uneven harvested material supply is avoided. Moreover, determining the harvested material throughput and the vibration coefficient in a region lying in front of the threshing system allows for quickly reacting to changing threshing conditions, and thereby determining an appropriate cutting table length. The cutting table length as well as the harvested material throughput that describes the delivered amount of harvested material are functionally dependent on each other so that, if the cutting table length is less than optimally adapted to the harvested material throughput, an inhomogeneous or varying harvested material throughput results. It is noted that inhomogeneities of the harvested material throughput correspondingly form a particularly effective quality criterion for determining the cutting table length. As such, the harvested material throughput may be used as a way to determine the cutting table length. Further, a vibration coefficient may be used a measure of the inhomogeneities, and is therefore highly useful in determining an optimum cutting table length for the current threshing conditions.

In one or some embodiments, the driver assistance system may be configured to use the determined harvested material throughput and/or the vibration coefficient for adapting the cutting table length. The driver assistance system's use of the determined harvested material throughput and/or the vibration coefficient in determining the cutting table length may better determine an optimally suitable cutting table length.

In one or some embodiments, the manner in which to determine the harvested material throughput may comprise a throughput measuring apparatus located in the inclined conveyor, wherein the throughput measuring apparatus is configured such that it determines a throughput-dependent material flow signal that may comprise up-and-down movements of a conveying unit caused by a harvested material flow, such as a rotatingly drivable conveyor chain. In particular, determining the up-and-down movements of the conveying unit as an indication of throughput for a throughput measuring apparatus allows a material flow signal to be easily and economically determined, so that the harvested material throughput and the vibration coefficient may be determined using simple measures indicative of such a material flow signal.

In one or some embodiments, the throughput measuring apparatus may comprise at least one sensor element, such as an inductive sensor element, that detects contact-free up-and-down movements of the delivery unit caused by a harvested material flow in order to achieve the detection of the up-and-down movements of the conveying unit in a straightforward manner.

In one or some embodiments, the throughput measuring apparatus may be operatively connected to a layer height roller in the inclined conveyor, wherein the layer height roller is arranged or positioned such that the up-and-down movements of the conveying unit caused by the harvested material flow are transmitted to the layer height roller. The throughput measuring apparatus may be designed or positioned such that the throughput measuring apparatus detects the up-and-down movements of the layer height roller in order to detect the up-and-down movements of the conveying unit in a straightforward manner.

In one or some embodiments, the driver assistance system may record the throughput-dependent material flow signal and saves the throughput-dependent material flow signal in a memory. The material flow signal may be divided into its frequency components (such as at least two frequency components) in the computing device using frequency analysis so that an analysis of the material flow signal may be performed in a straightforward manner. For example, the frequencies relevant for determining the machine parameters may be determined particularly easily by filtering the frequency components.

In one or some embodiments, the driver assistance system may be designed such that the frequency components may be separated into a constant component and into a non-constant component (e.g., a vibration component) using the computing device, wherein the vibration coefficient may be determined using the vibration component.

In one or some embodiments, the harvested material throughput may be determined using the constant component.

In one or some embodiments, the constant component may comprise the frequency components with low frequencies, and the vibration component may comprise the frequency components with higher frequencies.

This may have one or more advantages. Accordingly, for example, the frequency components with high frequencies may easily be assigned to the variances in the harvested material throughput and may be used to determine the vibration coefficient. At the same time, high-frequency components may be used to determine the harvested material throughput.

Low frequencies, such as a frequency of 0 Hz, may be particularly suitable for describing the harvested material throughput since the low frequencies reflect the amplitude of the conveying unit over a longer period in time. Moreover, the higher frequencies, such as frequencies that are higher than 0 Hz, may be particularly well-suited for describing the up-and-down movement of the conveying unit and hence the variance in the harvested material throughput.

In one or some embodiments, a total of the amplitude levels of the frequencies assigned to the constant component may form the harvested material throughput so that a measure that describes the harvested material throughput may be determined in a simple manner from the frequencies assigned to the constant component.

In one or some embodiments, a total of the amplitude levels of the frequencies assigned to the vibration component may form, indicate or be used to determine the vibration coefficient so that the vibration coefficient may be determined in a straightforward manner from the frequencies assigned to the vibration component.

In one or some embodiments, the driver assistance system may be designed to depict the functional relationships between the vibration coefficient, the harvested material throughput and the cutting table length in a characteristic map and control the cutting table length by the characteristic map. Using the characteristic map, the above functional relationships may be depicted with less computing effort.

In one or some embodiments, a particular cutting table length may be determined within the characteristic map for the scaled harvested material throughputs in which the vibration coefficient assumes a minimum. This determination of the minimums assigned to the scaled harvested material throughputs is particularly advantageous since they may indicate the optimum cutting table length for controlling the harvesting header within the characteristic map.

In one or some embodiments, the driver assistance system may be configured to specify the cutting table length for the cutting unit for a harvested material throughput currently in the harvester in which the vibration coefficient assumes the minimum. This is particularly advantageous since the fluctuations in the harvested material throughput may thereby be reduced.

In particular, the driver assistance system may be configured so that it at least cyclically (such as periodically) adapts the characteristic map to a harvesting process status that exists during a threshing procedure. This is particularly advantageous since the cutting table length optimally suitable for the currently existing process status may therefore be continuously determined using the characteristic map.

In one or some embodiments, at least one initial characteristic map is saved in the memory of the driver assistance system, wherein in the initial determination of the cutting table length, the driver assistance system performs the determination based on the initial characteristic map; in particular, at the beginning of the threshing process, the driver assistance system may determine the cutting table length based on the initial characteristic map. Given an appropriate selection of the initial characteristic map, the initial characteristic map may thereby be brought into close correspondence with the actual harvesting process status in only a few adjustment cycles.

In one or some embodiments, setting up the driver assistance system to adapt the reel position and/or reel vertical position to the cutting table length may ensure an optimum supply of the harvested material to the screw conveyor and prevent spray grain loss.

Referring to the figures, FIG. 1 illustrates a side view of an example harvester. Agricultural harvester 1 may be designed as a combine and include a cutting unit 2 designed as a harvesting header for cutting and receiving harvested material. The cutting unit 2 may be exchangeable with another cutting unit 2 so that the agricultural harvester 1 may be adapted to harvesting different types of crops. In one or some embodiments, the harvested crop is understood to be all of the material received from the crop 3 through the cutting unit 2. As can be seen in FIG. 1, the crop 3 is mown by the cutting unit 2, and the harvested material obtained thereby is supplied to an inclined conveyor 4.

Agricultural harvester 1 furthermore has a driver assistance system 5 configured to control the cutting unit 2. Driver assistance system 5 comprises at least one memory 6 for saving data (e.g., a memory in terms of information technology) and a computing device 7 for processing the data saved in the memory 6.

The computing device 7 may comprise any type of computing functionality, such as one or more processors (which may comprise a microprocessor, controller, PLA or the like). Memory 6 may comprise any type of storage device (e.g., any type of memory), as discussed further herein. Though computing device 7 and memory 6 are depicted as separate elements, they may be part of a single machine, which includes a microprocessor (or other type of controller) and a memory.

The microprocessor and memory are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry, such as computing device 7, may store in or access instructions from memory 6 for execution, or may implement its functionality in hardware alone. The instructions, which may comprise computer-readable instructions, may implement the functionality described herein and may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described herein or illustrated in the drawings.

Figure 2:
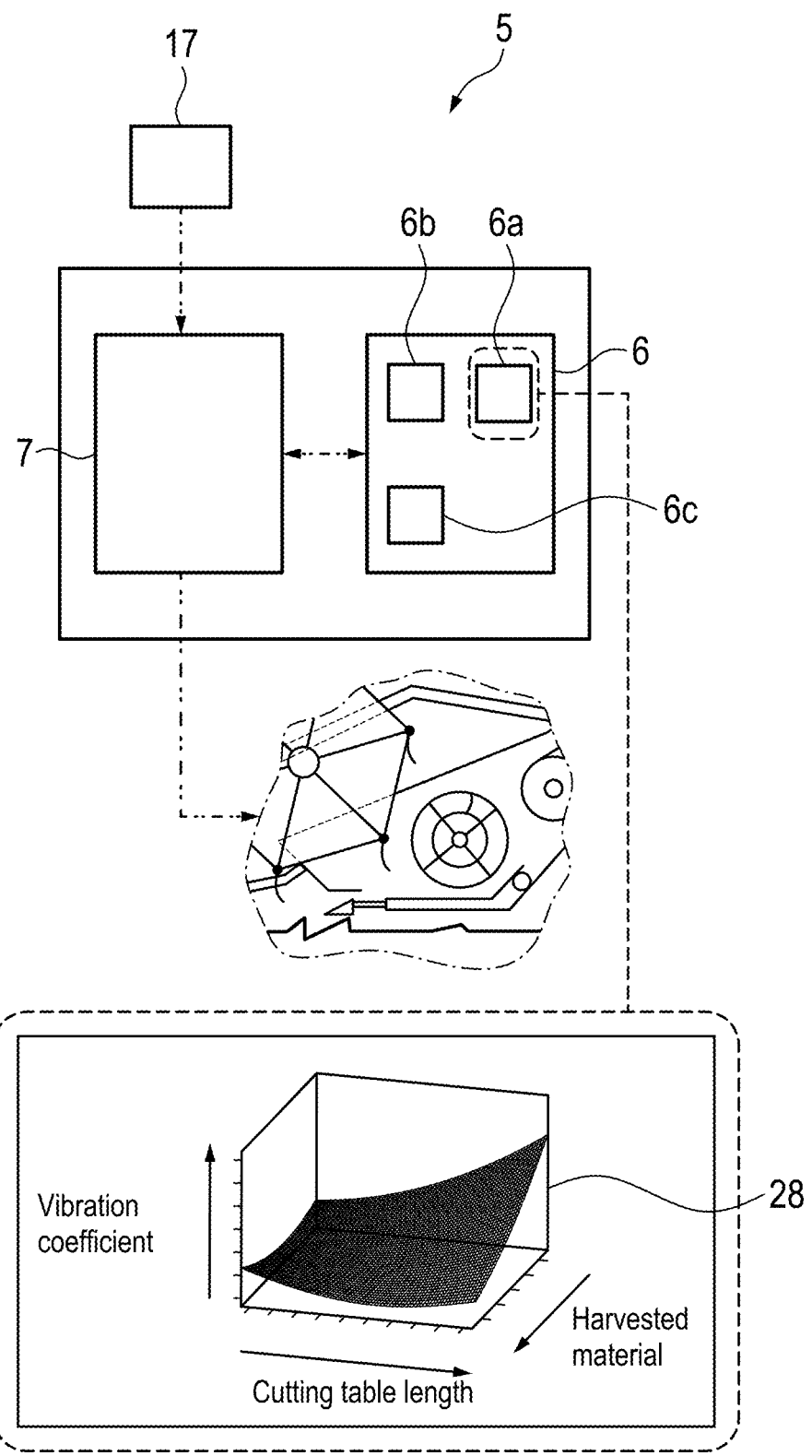
FIG. 2 illustrates a schematic representation of a driver assistance system of an example harvester disclosed in FIG. 1.

In one or some embodiments, the driver assistance system 5 is configured to assist the driver 8 of the agricultural harvester 1 to operate the agricultural harvester 1. The driver assistance system 5 with the memory 6 and the computing device 7 is schematically shown in FIG. 2, wherein the other details on the driver assistance system 5 are found in U.S. Pat. No. 9,807,926, the entire disclosure of which is incorporated by reference herein.

In one or some embodiments, the computing device 7 is configured to autonomously determine at least one machine parameter for the cutting unit 2 and to specify it to the cutting unit 2. The determination of the machine parameter(s) may be an autonomous determination to the extent that intervention by the driver 8 or a query to the driver 8 is unnecessary when determining the machine parameters in a narrower sense. Such an intervention by the driver 8 is accordingly still possible in principle, but unnecessary.

The cutting unit 2 of the harvester 1 has a reel 9 running perpendicular to the driving direction of the agricultural harvester 1 that acts on the still uncut harvested material through tines 10 arranged thereupon. The reel 9 has the primary task of supplying the harvested material to a cutter bar 11 that has a movable blade 12. The blade 12 oscillates with a cutting frequency so that the harvested material is cut and falls onto a cutting table 13, on the front side of which the cutter bar 11 is located. Then, the harvested material, possibly with the continued influence of the reel 9, is supplied to the inclined conveyor 4 by an auger 14. The inclined conveyor 4 conveys the harvested material to a threshing system 32 downstream therefrom in terms of processing.

Depending on the equipment, the cutting unit 2 permits the adjustment of various machine parameters using corresponding drives (not shown here) that may be controlled by the driver assistance system 5.

The cutting table 13 whose length may be changed is assigned to the machine parameter 15a of "cutting table length". The machine parameter 15b of "reel longitudinal position" and the machine parameter 15c of "reel vertical position" may also be assigned to the reel 9.

In one or some embodiments, a functional system model 6a for at least part of the harvesting machine 1 is saved in the memory 6 of the driver assistance system 5, wherein the computing device 7 performs the above-disclosed autonomous determination of one, some or all of the machine parameters 15a, 15b, 15c based on the system model 6a. The functional system model 6a may comprise a calculated model for depicting functional relationships within the agricultural harvester 1.

Throughput measuring apparatus 16 arranged or positioned in the inclined conveyor 4 is configured to detect a throughput-dependent material flow signal 17. In one or some embodiments, the throughput measuring apparatus 16 is configured to determine the up-and-down movements caused by the harvested material flow of at least one conveying unit 19 of the inclined conveyor 4 designed as a conveyor chain 18 relative to a floor 20 of the inclined conveyor 4. To accomplish this, the throughput measuring apparatus 16 may comprise at least one sensor 33, such as at least one inductive sensor element. In one or some embodiments, a plurality of sensor elements may be distributed over the width of the inclined conveyor 4.

In addition or alternatively, the throughput measuring apparatus 16 may detect the up-and-down movements of a layer height roller 21 that is operatively connected with the conveyor chain 18, wherein the layer height roller 21 is arranged such that the up-and-down movements of the conveyor chain 18 are transferred to the layer height roller 21. Particulars with respect to the structure of such a throughput measuring apparatus 16 are described in detail in DE 102019116452.4, the entire disclosed content of which is hereby incorporated by reference.

The throughput-dependent material flow signal 17 may be transmitted by the throughput measuring apparatus 16 to the driver assistance system 5, wherein the driver assistance system 5 records the material flow signal 17 and saves it as material flow data 6b in the memory 6. The driver assistance system 5, using the throughput-dependent material flow signal 17, may determine one or both of the harvested material throughput 26 that describes an amount of harvested material conveyed by the inclined conveyor 4 as a function of time and a vibration coefficient 25 that describes a measure of the variance of the harvested material throughput 26. A separate determination of the harvested material throughput by the throughput measuring apparatus 16 is also contemplated.

Figure 3:
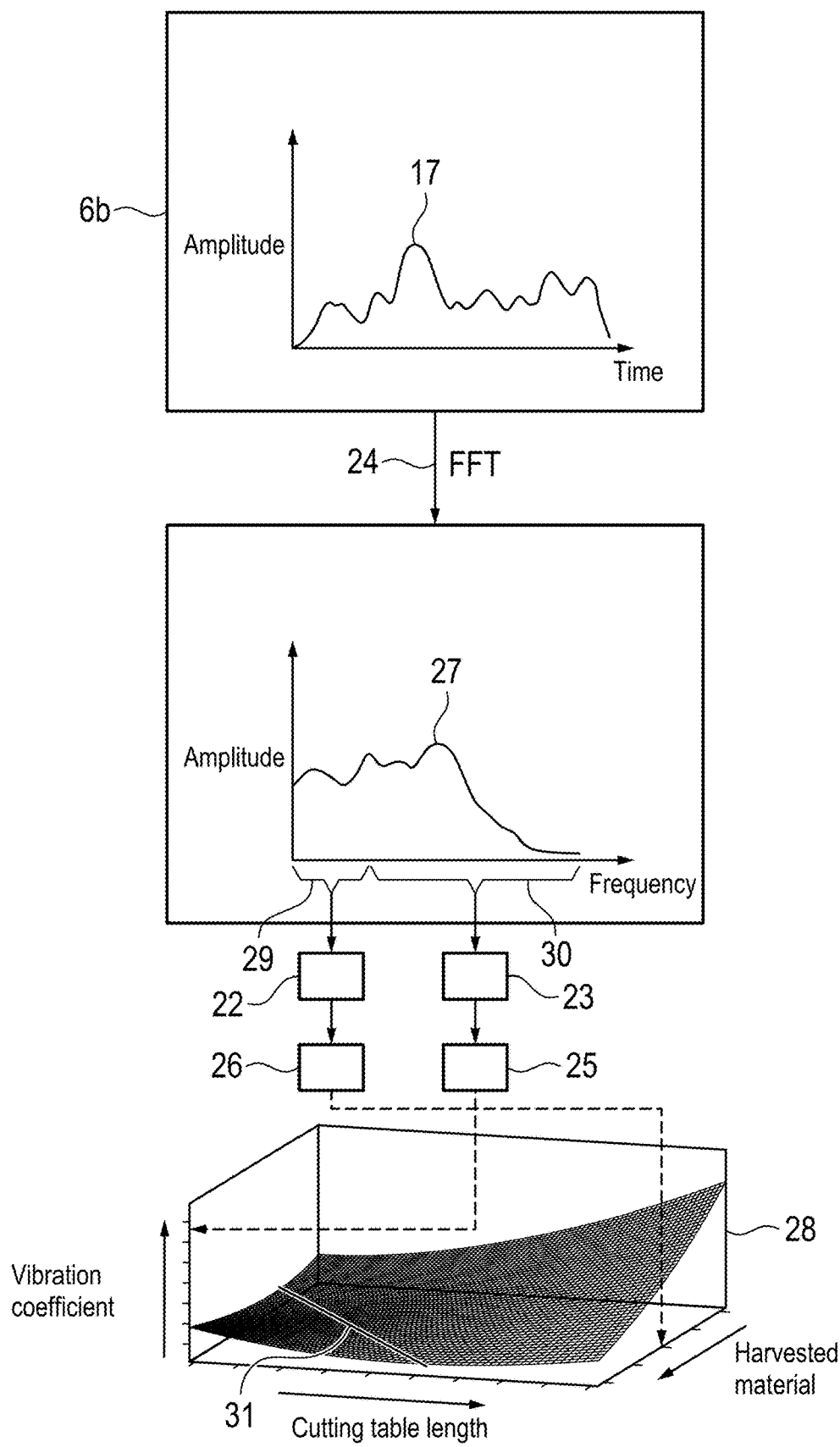
FIG. 3 illustrates a schematic flowchart for determining the cutting table length.

As schematically shown in FIG. 3, the driver assistance system 5 may divide the material flow data 6b saved in the memory 6 using frequency analysis 24, such as by Fourier analysis, into its frequency components 27 to determine the harvested material throughput 26 and the vibration coefficient 25. In so doing, the frequency components 27 are subdivided into a constant component 22 that describes the harvested material throughput 26, and into a vibration component 23 that describes the variances of the harvested material throughput 26, or the vibration of the layer height roller 21, wherein the vibration component 23 forms the evaluation variable of the vibration coefficient 25. In this regard, the vibration coefficient may describe the fluctuation in the harvested material in a certain region, such as in throughput in a region lying in front of the threshing system. Responsive to this determination of the vibration coefficient, a part of the agricultural harvester 1, such as the driver assistance system 5, may cause adaption or modification of the cutting table length based on the determined vibration coefficient (e.g., by sending a command to the cutting unit to modify the cutting table length).

In detail, the frequency components 29 with low frequencies, such as with a frequency of 0 Hz, are assigned to the constant component 22, and the higher frequency components 30 are assigned to the vibration component 23. In this regard, it is contemplated to filter out any interfering components, or to only assign a specific portion of the higher frequency components 30 to the vibration component 23. Moreover, the harvested material throughput 26 is calculated from the total amplitude levels of the frequency components 29 assigned to the constant component. Analogous thereto, the vibration coefficient 25 results from the total amplitude levels of the frequencies assigned to the vibration component 23.

To calculate the harvested material throughput 26 and the vibration coefficient 25, a time interval of the material flow data 6b directly prior may be considered so that the material flow data 6b used may therefore describe the harvesting process status that currently exists in the harvester. One or both of the vibration coefficient 25 determined within the time interval and the harvested material throughput 26 may be entered into a characteristic map 28 with the cutting table length 15a existing within the time interval so that the characteristic map 28 depicts the functional relationships between the vibration coefficient 25, the harvested material throughput 26 and the cutting table length 15a. In one or some embodiments, the vibration coefficient 25 and/or the harvested material throughput 26 may be determined cyclically (e.g., within given intervals in time).

As explained above, the functional relationships may be depicted in a characteristic map 28. For the beginning of a threshing process in which currently prevailing threshing conditions are not yet depicted in the characteristic map 28, the driver assistance system 5 may use an initial characteristic map 6c that is saved in the memory 6 of the driver assistance system 5. During the threshing process, the initial characteristic map 6c may be adapted or modified to the currently existing conditions using the functional relationships determined in this context so that the resulting characteristic map 28 depicts the threshing conditions currently existing in the harvester.

To reduce the variance of the harvested material throughput 26 that is described or indicated by the vibration coefficient 25, the driver assistance system 5 is configured to determine the particular minimum 31 of the vibration coefficient 25 for the harvested material throughputs 26 scaled in the characteristic map 28. During a threshing process, the driver assistance system 5 is configured to determine, using the characteristic map 28, the minimum 31 that is assigned to the last determined harvest material throughput 26 and the cutting table length 15a assigned to this minimum 31 that is specified to the cutting unit 2 for controlling.

As explained above, the functional relationships are depicted in a characteristic map 28. For the beginning of a threshing process in which currently prevailing threshing conditions are not yet depicted in the characteristic map 28, the cutting table length 15a may be determined based on the initial characteristic map 6c.

In another embodiment, the driver assistance system 5 is configured so that the reel longitudinal position 15b and/or the reel vertical position 15c are adapted to the cutting table length 15a. To accomplish this, the reel 9 is within a manually or automatically specified region relative to the cutter bar 11 in its reel longitudinal position 15b and/or reel vertical position 15c. For example, this range may be saved in the memory 6 of the driver assistance system 5 depending on the harvested material to be harvested, or may be manually entered by the driver 8.

Some or all of the features realized in conjunction with the above-described exemplary embodiment may, in principle, also advantageously function independent of each other and are not necessarily dependent on the portrayed combination of features, to the extent that the features are not combined in the independent claims.

Further, it is intended that the foregoing detailed description be understood as an illustration of selected forms that the invention can take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Agricultural harvester
2 Cutting unit
3 Crop
4 Inclined conveyor
5 Driver assistance system
6 Memory
6a System model
6b Material flow data
6c Initial characteristic map
7 Computing device
8 Driver
9 Reel
10 Tines
11 Cutter bar
12 Blade
13 Cutting table
14 Auger
15a Cutting table length
15b Reel longitudinal position
15c Reel vertical position
16 Throughput measuring apparatus
17 Material flow signal
18 Conveyor chain
19 Conveying unit
20 Floor
21 Layer height roller
22 Constant component
23 Vibration component
24 Frequency analysis
25 Vibration coefficient
26 Harvested material throughput
27 Frequency components
28 Characteristic map
29 Low frequency components
30 High frequency components
31 Minimum
32 Threshing system
33 Sensor

The invention claimed is:
1. An agricultural harvester comprising:
a cutting table configured to adjust a cutting table length of a cutting unit, the cutting unit configured as a harvesting header for cutting and receiving harvested material;
a reel of the cutting unit, the reel configured to be adjusted to a reel vertical position and reel longitudinal position;
an inclined conveyor downstream from the cutting unit and upstream from a threshing system of the agricultural harvester; and
a driver assistance system comprising at least a processor and a memory, the driver assistance system configured to:
separate frequency components of a material flow signal into a constant component and a vibration component, the vibration component including higher frequencies than the constant component;
determine harvested material throughput based on the constant component;
determine a vibration coefficient based on the vibration component, wherein the vibration coefficient is indicative of fluctuation in the harvested material throughput in a region lying in front of the threshing system; and cause modifying of the cutting table length based on the vibration coefficient.

2. The agricultural harvester of claim 1, wherein the driver assistance system is configured to autonomously determine at least one machine parameter using at least one sensed input and specify the at least one machine parameter to the cutting unit, wherein the at least one machine parameter comprise any one, any combination, or all of the cutting table length, the reel vertical position, or the reel longitudinal position.

3. The agricultural harvester of claim 2, wherein the driver assistance system is configured to use the harvested material throughput and the vibration coefficient to modify the cutting table length.

4. The agricultural harvester of claim 3, further comprising a throughput measuring apparatus positioned in or on the inclined conveyor, the throughput measuring apparatus configured to generate a throughput-dependent material flow signal as the material flow signal;

wherein the driver assistance system is configured to separate the throughput-dependent material flow signal into the constant component and the vibration component; and wherein the driver assistance system is configured to separate the throughput-dependent material flow signal into the constant component and the vibration component in order to determine the harvested material throughput and the vibration coefficient based on the throughput-dependent material flow signal.

5. The agricultural harvester of claim 4, wherein the throughput-dependent material flow signal is indicative of up-and-down movements of a conveying unit, the up-and-down movements caused by a harvested material flow.

6. The agricultural harvester of claim 5, wherein the throughput-dependent material flow signal is indicative of the up-and-down movements of a rotatingly drivable conveyor chain.

7. The agricultural harvester of claim 5, wherein the throughput measuring apparatus comprises at least one sensor element configured to detect contact-free the up-and-down movements of the conveying unit that is caused by the harvested material flow.

8. The agricultural harvester of claim 7, wherein the throughput measuring apparatus is operatively connected with a layer height roller in the inclined conveyor;

wherein the layer height roller is arranged such that the up-and-down movements of the conveying unit caused by the harvested material flow are transmitted to the layer height roller; and wherein the throughput measuring apparatus is configured to generate the throughput-dependent material flow signal based on the up-and-down movements of the layer height roller.

9. The agricultural harvester of claim 4, wherein the driver assistance system is configured to:

save the throughput-dependent material flow signal; and divide the throughput-dependent material flow signal into the constant component and the vibration component.

10. The agricultural harvester of claim 1, wherein the driver assistance system is configured to determine the harvested material throughput based on a total of amplitude levels of at least one frequency assigned to the constant component.

11. The agricultural harvester of claim 10, wherein the driver assistance system is configured to determine the vibration coefficient based on a total of amplitude levels of at least one frequency assigned to the vibration component.

12. The agricultural harvester of claim 1, wherein the driver assistance system is configured to:

depict functional relationships between the vibration coefficient, the harvested material throughput and the cutting table length in a characteristic map; and control the cutting table length using the characteristic map.

13. The agricultural harvester of claim 12, wherein the driver assistance system is configured to determine a particular cutting table length within the characteristic map in which the vibration coefficient assumes a minimum.

14. The agricultural harvester of claim 13, wherein the driver assistance system is configured to specify the cutting table length for the cutting unit for a harvested material throughput currently in the agricultural harvester in which the vibration coefficient assumes the minimum.

15. The agricultural harvester of claim 14, wherein the driver assistance system is configured to at least cyclically adapt the characteristic map to a harvesting process status that exists during a threshing procedure.

16. The agricultural harvester of claim 15, wherein at least one initial characteristic map is saved in the memory of the driver assistance system; and wherein the driver assistance system is configured to determine, based on the initial characteristic map, an initial determination of the cutting table length.

17. The agricultural harvester of claim 16, wherein the driver assistance system is configured to adapt one or both of the reel longitudinal position or the reel vertical position to the cutting table length.

18. The agricultural harvester of claim 1, wherein the harvested material throughput is indicative of an amount of harvested material conveyed by the inclined conveyor as a function of time; and wherein the vibration coefficient is indicative of variance of the harvested material throughput.

19. The agricultural harvester of claim 18, further comprising at least one sensor configured to generate a throughput-dependent material flow signal as the material flow signal;

wherein the throughput-dependent material flow signal is indicative of up-and-down movements of at least a part of the inclined conveyor; and wherein the driver assistance system is configured to determine both the vibration coefficient and the harvested material throughput based on the throughput-dependent material flow signal.

* * * * *